United States Patent Office 2,849,457
Patented Aug. 26, 1958

2,849,457

GAMMA-MONOLACTONE OF 4-HYDROXYSUBERIC ACID, ITS SALTS AND ESTERS, AND THE SALTS AND AMIDES OF 4-HYDROSUBERIC ACID, THEIR PREPARATION AND USE

Howard E. Holmquist, Wilmington, Del., assignor to E. I. du Pont de Nemours and Company, Wilmington, Del., a corporation of Delaware No Drawing. Application June 21, 1956
Serial No. 592,738

11 Claims. (Cl. 260—343.6)

This invention relates to novel chemical processes and to new organic chemical compounds. More particularly, this invention relates to a new monolactone acid, its salts and its esters and to salts and amides of its open-chain parent acid, and to methods for their preparation and conversion of these new products to open-chain polyhydric alcohols.

According to my copending U. S. patent application Ser. No. 579,459, filed on April 20, 1956, 1,8-octanedioic acids and 1,8-octanediols are obtained when the dilactone corresponding to $C_8H_4O_4$, $[\Delta^{2,2'(5H,5'H)}$-bifuran]-5,5'-dione, is hydrogenated at a temperature within the range of 150° C. to 325° C. in contact with a copper chromite catalyst. The aforementioned $C_8H_4O_4$ dilactone is obtained by reacting acetylene with carbon monoxide over a cobalt carbonyl catalyst, as disclosed and claimed in the copending patent application of J. C. Sauer, Ser. No. 432,599, filed May 26, 1954, now abandoned, of which Ser. No. 549,155, filed November 25, 1955, is a continuation-in-part.

It is an object of this invention to provide novel chemical processes and new organic chemical compounds. A further object is to provide a new monolactone acid, its esters and salts, and salts and amides of its open-chain parent acid. A still further object is to provide novel methods for preparing the aforementioned compounds. Another object is to provide a novel method for preparing carbalkoxypropylbutyrolactones and for converting them to open-chain saturated polyhydric alcohols. Still another object is to provide a new method for preparing a straight-chain aliphatic polyhydric alcohol useful in preparing polyesters. Other objects will appear hereinafter.

These and other objects of this invention are accomplished by providing the new monolactone acid of 4-hydroxysuberic acid, salts and esters of said monolactone acid, and salts and amides of 4-hydroxysuberic acid. This invention also includes novel methods for the preparation of these new compounds and conversion thereof to polyhydric alcohols, particularly of the monolactone acid and esters to 1,4,8-octanetriol.

The new monolactone acid of this invention is gamma-(omega-carboxypropyl)butyrolactone. This monolactone acid, its esters and salts correspond to the formula

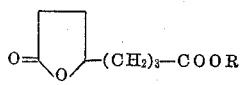

wherein R is hydrogen, hydrocarbon, preferably of up to seven carbon atoms, such as aryl or alkyl, especially lower alkyl, i. e., of 1 to 5 carbon atoms, or a metal or salt-forming group, as an amino group. When R is alkyl, the monolactone esters are gamma-(omega-carbalkoxypropyl)butyrolactones.

Alkali metal salts of the monolactone acid, gamma-(omega-carboxypropyl)butyrolactone, are obtained by treating the lactone acid at ordinary temperatures with aqueous alkali, and the open-chain parent 4-hydroxysuberic acid,

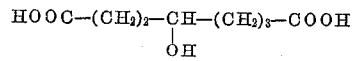

is obtained in the form of its alkali metal salt by treating the monolactone acid, gamma-(omega-carboxypropyl)butyrolactone with aqueous alkali followed by heating.

Amides of the open-chain 4-hydroxysuberic acid are obtained by reacting ammonia or a primary or secondary amine with the monolactone ester, gamma-(omega-carboalkoxypropyl)butyrolactone.

Conveniently the monolactone acid is obtained directly by hydrogenation of the unsaturated dilactone $C_8H_4O_4$ at temperatures from 75° to 275° C. and pressures of from 1000 to 10,000 lb./sq. in., over nickel in dioxane or other inert liquid organic reaction medium. The monolactone ester, along with an alkyl 4-(2-tetrahydrofuryl)-butanoate, is obtained by effecting the hydrogenation in the presence of an alcohol or ester.

In a convenient way for preparing the monolactone acid, gamma-(omega-carboxypropyl)butyrolactone, starting with the unsaturated dilactone, $[\Delta^{2,2'(5H,5'H)}$-bifuran]-5,5'-dione, a pressure reactor is charged with the unsaturated dilactone, an inert liquid organic reaction medium, such as dioxane, and at least 1%, by weight of the dilactone, of an active nickel catalyst. The charged reactor is swept with oxygen-free nitrogen, placed on an agitating rack, hydrogen is injected, and the charge maintained between 75° and 275° C. with agitation and under a pressure of 1000 to 10,000 lb./sq. in. After reaction is complete, as evidenced by cessation of pressure drop, the reactor is opened, discharged, and the contents filtered. The filtrate is subjected to fractional distillation to isolate the desired products. Other methods, however, can be used to isolate the desired products than fractional distillation.

The invention is illustrated in its specific preferred embodiments as follows:

Example I

A solution of 25 g. of $[\Delta^{2,2'(5H,5'H)}$-bifuran]-5,5-dione, in 200 ml. of ethyl acetate was charged into a pressure reactor along with 5 g. of alloy-skeleton nickel catalyst. After sweeping with oxygen-free nitrogen, hydrogen was injected so that at 250° C. the pressure within the reactor was 3000 lb./sq. in. These conditions were maintained for four hours. Thereafter the reactor was permitted to cool, opened, and the contents discharged and filtered. The filtrate was then submitted to fractional distillation and the following cuts collected:

| Fraction | | Weight, g. | $n_D^{25}$ |
|---|---|---|---|
| 1 | 66–70°/0.9 mm | 2.8 | 1.4438, less dense than water. |
| 2 | 70–120°/0.7–0.9 mm | 2.5 | 1.4521. |
| 3 | 125–129°/0.7 mm | 6.9 | 1.4539, denser than water. |
| 4 | 129–140°/0.7 mm | 2.7 | |
| 5 | 140–170°/0.7 mm | 6.7 | |

Fraction 1 was redistilled at 65° C./0.8 mm. ($n_D^{25}$ 1.4424) and corresponds to ethyl 4-(2-tetrahydrofuryl)-butanoate, $C_{10}H_{18}O_3$, having the structural formula:

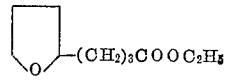

*Analysis.*—Calc'd for $C_{10}H_{18}O_3$: C, 64.49; H, 9.74; M, W., 186. Found: C, 64.63; H, 9.74; M. W., 182, 181.

Fractions 3 and 4 were combined and redistilled. The principal cut (8.1 g.) was found to boil at 134° C./1.8 mm. or 122° C./0.6 mm. A sample of this fraction was redistilled at 127° C./0.7 mm., $n_D^{25}$ 1.4540, and from its elemental data corresponds to gamma-(omega-carbethoxypropyl)butyrolactone, $C_{10}H_{16}O_4$, having the structural formula:

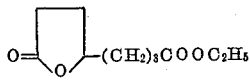

*Analysis.*—Calc'd for $C_{10}H_{16}O_4$: C, 59.98; H, 8.05; M. W., 200; Sap. Eq. 100, 100. Found: C, 60.17, 60.29; H, 8.13, 8.36; M. W., 200, 200; Sap. Eq., 103, 103.

Infrared analysis showed bands at 6.65μ for lactone carbonyl and at 5.75μ for ester carbonyl.

Methyl acetate can be used instead of ethyl acetate to obtain the methyl ester, gamma-(omega-carbomethoxypropyl)butyrolactone.

Example II

Following the procedure of Example I, the reactor was charged with 15.5 g. of [$\Delta^{2,2'(5H,5'H)}$-bifuran]-5,5'-dione, 200 ml. of absolute ethanol, and 2 to 3 g. of alloy-skeleton nickel. Hydrogen was injected so that at 235° C. the pressure was 3000 lb./sq. in. These conditions were maintained for 4 hours. The pressure drop during this time was 200 lb./sq. in. After filtering, to remove the catalyst, the filtrate was concentrated by distillation and the distillate fractionally distilled to give cuts as follows:

| Fraction | B. P., ° C. | Pressure, mm. | Wgt./g. |
| --- | --- | --- | --- |
| 1 | 80–115 | 1.8 | 1.4 |
| 2 | 115–130 | 1.8 | 0.2 |
| 3 | 130–146 | 1.8 | 0.2 |
| 4 | 146–153 | 1.8 | 0.9 |
| 5 | 153–159 | 1.8 | 3.0 |
| 6 | 160–176 | 1.8 | 2.9 |
| 7 | 176–182 | 0.9 | 0.2 |
| 8 | 182–191 | 1.5 | 2.0 |
| 9 | Tarry residue | | |

Fractions 7 and 8 crystallized to the hexahydrodilactone, tetrahydro - [2,2' - bifuran] - 5,5' - (2H,2'H)-dione. This amounted to a 14% yield.

Fraction 1 was redistilled and had an $n_D^{25}$ 1.4403, and corresponded to ethyl 4-(2-tetrahydrofuryl)butanoate, $C_{10}H_{18}O_3$.

*Analysis.*—Calc'd for $C_{10}H_{18}O_3$: C, 64.49; H, 9.74; M. W., 186. Found: C, 63.60, 63.58; H, 10.10, 10.31; M. W., 192.

Fractions 4, 5 and 6 were refractionated under 0.9 mm. pressure to give a main fraction boiling at 138–141° C. under 0.9 mm. pressure, $n_D^{25}$ 1.4547, corresponding to gamma-(omega-carbethoxypropyl)butyrolactone.

*Analysis.*—Calc'd for $C_{10}H_{16}O_4$: C, 59.98; H, 8.05. Found: C, 60.19; H, 8.28.

Methanol can be used instead of ethanol to obtain the methyl ester, gamma-(omega-carbomethoxypropyl)butyrolactone.

Example III

To a one-liter stainless steel pressure vessel was added 90 g. of once recrystallized [$\Delta^{2,2'(5H,5'H)}$-bifuran]-5,5'-dione, 700 ml. of dioxane and alloy-skeleton nickel. The reactor was repeatedly evacuated and flushed with nitrogen until air was removed. The reaction mixture was heated at 75–100° C. under 1000 lb./sq. in. hydrogen pressure until 0.8 mole of hydrogen were absorbed and further absorption ceased. The catalyst was removed by filtration and the excess dioxane removed at 100° C. under reduced pressure. Distillation of the remaining oil through an 8″ Vigreux column gave 74 g. of a colorless oil boiling at 180–183.5/0.8 mm. pressure.

Analysis showed the product to contain gamma-(omega - carboxypropyl)butyrolactone and tetrahydro- [2,2'-bifuran]-5,5'-(2H, 2'H)-dione in essentially equal amounts.

Benzylamine (0.77 g.) dissolved in one ml. of dioxane was added to 2 ml. of the reduction product obtained as above, dissolved in 4 ml. of dioxane. Addition of diethylether caused precipitation of a white, crystalline product, 1.12 g. (56% yield). Two recrystallizations from dioxane gave a product melting at 101° to 102° C. which analyzed as follows:

*Analysis.*—Calc'd for $C_{15}H_{21}NO_4$: C, 64.49%; H, 7.58%; N, 5.02%. Found: C, 64.62%; H, 7.55%; N, 4.94%.

Example IV

To a stainless steel pressure vessel was added 30 g. of pure [$\Delta^{2,2'(5H,5'H)}$-bifuran]-5,5'-dione, 200 ml. of decahydronaphthalene, and 3–5 g. of alloy-skeleton nickel. The vessel was closed, evacuated, and flushed with nitrogen until free of air. The suspension was heated at 200° C. and 3000 lb./sq. in. hydrogen pressure until hydrogen absorption ceased. The resulting mixture was filtered and the filtrate distilled under reduced pressure to give 12.1 g. of a colorless oil.

Analysis of this oil indicated that it contained approximately 90–94% tetrahydro - [2,2' - bifuran] - 5,5'-(2H,2'H)-dione and 10–15% of gamma-(omega-carboxypropyl)butyrolactone.

A solution was prepared by dissolving 8 g. of hexamethylenediamine in 50 ml. of dioxane, which corresponds to a concentration of 0.13 g. of the diamine per ml. of solution.

Another solution was prepared by dissolving 10.2 g. of the oily reduction product, obtained as above, in 15 ml. of dioxane. To this solution there was added 26.8 ml. of the hexamethylenediamine solution with stirring and cooling to maintain the temperature of the reaction mixture at ca. 22° C. The white solid which formed was separated by filtration and washed with diethyl ether. The dried product weighed 2.72 g., which corresponds to a 57% yield on the total weight of reactants. After recrystallization from 35 ml. of absolute ethanol with diethyl ether, the white product, which is the hexamethylenediammonium salt of the lactone acid, gamma-(omega-carboxypropyl)butyrolactone, melted at 118° to 119° C.

*Analysis.*—Calc'd for $C_{22}H_{40}N_2O_3$: C, 57.37%; H, 8.76%; N, 6.08%. Found: C, 57.13%; H, 8.86%; N, 6.06%, 6.07%.

Example V

A solution of 8.5 g. of gamma-(omega-carboxypropyl)butyrolactone, 0.2 g. of p-toluenesulfonic acid in 250 ml. of ethanol was refluxed for 50 hours. The solution was neutralized with solid sodium bicarbonate and the product distilled at 138–140° C./2 mm. to give 6.7 g. (68%) of the ethyl ester.

The fraction boiling at 139–141° C./2 mm. weighed 4.8 g. and constituted the main cut. It had an $n_D^{25}$ 1.4552 and corresponded to gamma-(omega-carbethoxypropyl)butyrolactone.

Methanol can be used instead of ethanol to obtain the methyl ester, gamma-(omega-carbomethoxypropyl)-butyrolactone.

Example VI

A solution of 2.8 g. of gamma-(omega-carbomethoxypropyl)butyrolactone, in 25 ml. of 28% aqueous ammonia was heated overnight on a steam bath. The residue solidified when it was triturated with hot methyl ethyl ketone.

The tan powder thus obtained weighed 0.6 g. It was recrystallized twice from ethanol to give the diamide of 4-hydroxysuberic acid, melting sharply at 151° C.

*Analysis.*—Calc'd for $C_8H_{16}O_3N_2$: C, 51.05; H, 8.57; N, 14.88. Found: C, 51.27; H, 8.77; N, 14.37.

The unsaturated dilactone corresponding to $C_8H_4O_4$,

[Δ$^{2,2'(5H,5'H)}$-bifuran]-5,5'-dione, used in the above examples was prepared by charging into a 400 cc. steel pressure reactor 26 g. of acetylene, 200 ml. of acetone, and 1.5 g. of dicobalt octacarbonyl. The mixture was heated with carbon monoxide at 1000 atm. pressure for 14–17 hours. The product was filtered and the brown solid was extracted with ethyl acetate for 24 hours. The extract was permitted to crystallize and the crystalline material was separated, and dried at room temperature. There was obtained 20 g. of the unsaturated dilactone, $C_8H_4O_4$, M. P. 229° C. after several recrystallizations from acetic acid. This dilactone exists in cis and trans isomeric forms. These two structural isomers yield suberic acid when hydrogenated with platinum in acetic acid. The normal or low-melting form, M. P. 230–237° C., is the trans form and the high-melting form, M. P. 240–248° C., is the cis form. The formulae of these structural isomers of [Δ$^{2,2'(5H,5'H)}$-bifuran]-5,5'-dione are as follows:

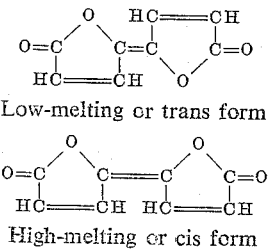

Low-melting or trans form

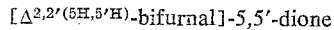

High-melting or cis form

Although the examples have illustrated batch operation, it is to be understood that the process can be carried out as a continuous or semi-continuous up-flow, down-flow, no-current, or counter-current vapor or liquid phase operation, with recovery of unconverted reactants for recycling.

The hydrogenation of the [Δ$^{2,2'(5H,5'H)}$-bifuran]-5,5'-dione is effected at 75° C. to 275° C. and pressures of from 1000 to 10,000 lb./sq. in. or more.

The hydrogenation can be effected with any active nickel catalyst. The nickel catalyst may be in the form of stabilized or pyrophoric metal, as the oxide, or salt. Elementary nickel in pyrophoric or stabilized state can be prepared by methods yielding the active form of the metal at temperatures below 150° C., or by reducing a salt, oxide, or hydroxide of the metal with hydrogen at temperatures in the range of 400–700° C. The pyrophoric metal may be stabilized by exposure to an oxidizing atmosphere under conditions such that the temperature of the catalyst is maintained below 50° C.

Pyrophoric nickel may be conveniently made by extracting with alkali the alkali-soluble component of an alloy of nickel with an alkali-soluble metal or by reducing a nickel salt with sodium naphthalene as described in U. S. Patent 2,177,412. The nickel catalyst may be unsupported or supported. The extender may be added during the catalyst preparation or it may be formed in situ. Suitable supports are alumina, silica, pumice, charcoal, etc. The example which follows illustrates preparation of a typical alloy-skeleton nickel catalyst.

Three hundred parts of a finely divided alloy composed of equal parts of nickel and aluminum is added with stirring, over a period of one and one-half hours, to a solution of 342 parts of sodium hydroxide in 1590 parts of distilled water maintained at 50° C. The supernatant liquid is then decanted off and the catalyst is washed with distilled water until it is free from alkali.

The product is pyrophoric and it may be stabilized as follows:

The aqueous sludge of the product is placed in a rotating vessel. The vessel is sealed, the air is exhausted by means of a vacuum pump and the mass heated under vacuum until all free water is removed. The vessel is then cooled continuously with cold water and a small amount of air is blown through the dry mass at such a rate that the temperature of the dry mass does not exceed 50° C. After 2 hours a sample of the dry product is no longer pyrophoric. The catalyst is found by analysis to consist of 37% nickel, of which 55% is in the elementary state, and 43% $Al_2O_3$. The catalyst therefore probably consists of partially oxidized nickel supported on alumina.

The amount of nickel catalyst is at least 1% by weight of the [Δ$^{2,2'(5H,5'H)}$-bifuran]-5,5'-dione being hydrogenated. Since the rate of hydrogenation is improved by increasing the catalyst concentration, usually an amount is employed which is at least 5% and preferably 10% by weight of the [Δ$^{2,2'(5H,5'H)}$-bifuran]-5,5'-dione being hydrogenated.

As shown in the examples, hydrogenation of

[Δ$^{2,2'(5H,5'H)}$-bifuran]-5,5'-dione with nickel in dioxane yields as principal products a mixture of gamma(omega-carboxypropyl)butyrolactone and the meso and racemic forms of tetrahydro-[2,2'-bifuran]-5,5'-(2H,2'H)-dione. The latter material separates from the mixture as a crystalline phase and the former, together with some dilactone, remains in the oil phase. The oil is dissolved in water, the aqueous solution is neutralized with sodium bicarbonate, and the dilactone is extracted with chloroform. The remaining aqueous solution is acidified and extracted with an organic solvent to obtain the acid, which is then distilled through a precision still under reduced pressure. In an alternative method for isolating the mixture of gamma-(omega-carboxypropyl)butyrolactone and of meso and racemic forms of tetrahydro[2,2'-bifuran]-5,5'-(2H,2'H)-dione the oil is neutralized with saturated aqueous sodium bicarbonate and the neutralized mixture is cooled in an ice bath. The crystalline phase that forms is the mixture of meso and racemic forms of tetrahydro-[2,2'-bifuran]-5,5-(2H,2'H)-dione, and is isolated by filtration. The remaining aqueous phase contains the sodium salt of gamma-(omega-carboxypropyl)-butyrolactone. The free acid is isolated from the sodium salt by acidification, followed by extraction with an organic solvent, and distillation of the solvent. Nickel, cobalt, iron, and other metal salts can be made by reacting the sodium salt in solution with a salt of the metal whose salt is desired.

The examples have illustrated preparation of gamma-(omega-carboxypropyl)butyrolactone and gamma-(omega-carbethoxypropyl)butyrolactone by hydrogenating respectively in dioxane or decahydronapthalene, and in ethanol or ethyl acetate as the liquid organic reaction medium. It is to be understood that the dioxane can be replaced by tetralin, cyclohexane, isooctane, and other liquid organic compounds which are unreactive with carboxyl groups and that in place of ethanol and ethyl acetate there can be used other alkanols, preferably lower alkanols of from 1 to 5 carbon atoms, and esters of such alkanols with aliphatic carboxylic acids, preferably of 1 to 5 carbon atoms. When these alkanols and esters are used there are obtained the corresponding gamma-(omega-carbalkoxypropyl)butyrolactones. Thus, with methanol or methyl acetate there is obtained gamma-(omega-carbomethoxypropyl)butyrolactone; with butanol or butyl propionate there is obtained gamma-(omega-carbobutoxypropyl)butyrolactone; with propanol or propyl valerate there is obtained gamma-(omega-carbopropoxypropyl)-butyrolactone; etc.

The amount of reaction medium can be varied over wide limits. Usually, however, an amount is used which is at least stoichiometrically equivalent to the [Δ$^{2,2'(5H,5'H)}$-bifuran]-5,5'-dione being hydrogenated.

The gamma-(omega-carbalkoxypropyl)butyrolactones, gamma-(omega-carboxypropyl)butyrolactone and its salts and the 4-(2-tetrahydrofuryl)butanoic acid esters produced in accord with this invention as well as the salts and amides of 4-hydroxysuberic acid, are useful for conversion to the eight carbon straight chain polyols. These polyols are useful for preparing polyesters which have utility as protective coatings, components of coating compositions, and the like. The conversion of the gamma-(omega-carbethoxypropyl)butyrolactone to the polyol, 1,4,8-octanetriol employing a copper chromite catalyst, is illustrated below:

*Example A*

A solution of 4.1 g. of gamma-(omega-carbethoxypropyl)butyrolactone in 150 ml. of dioxane was hydrogenated over copper barium chromite (1.5 g.) at 225° C. and 3000 lb./sq. in. hydrogen pressure for 3 hours. The viscous product (3.7 g.) was distilled at 151–164° C. (0.5 mm.), to give a principal fraction boiling at 161–164° C. (0.5 mm.). The chemical composition of this fraction shows it to be 1,4,8-octanetriol.

*Analysis.*—Calc'd for $C_8H_{18}O_3$: C, 59.23; H, 11.18. Found: C, 58.32, 58.57; H, 10.89, 11.14.

Infrared spectral analysis shows strong absorption in the hydroxyl region at $3.05\mu$, which is consistent with the 1,4,8-octanetriol structure.

The 1,4,8-octanetriol obtained in accord with Example A above, being a polyhydric alcohol, is useful for preparing polyesters by reaction with carboxylic acids by methods well known to those skilled in the art. Thus, with polycarboxylic acids such as adipic and sebacic acids, there are obtained polymeric polyesters which are useful as protective coatings, as components of coating compositions, and the like.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A gamma - (omega - carbalkoxypropyl(butyrolactone.

2. Gamma - (omega - carbethoxypropyl)butyrolactone.

3. Gamma-(omega-carboxypropyl)butyrolactone.

4. Process for preparing an oxygen-containing heterocyclic compound which comprises heating and hydrogenating $[\Delta^{2,2'(5H,5'H)}$-bifuran]-5,5'-dione with hydrogen in contact with a nickel hydrogenation catalyst at a temperature in the range of 75° to 275° C. and under a pressure of 1000 to 10,000 lb./sq. in., in the presence of a liquid organic reaction medium selected from the group consisting of dioxane, decahydronaphthalene, tetralin, cyclohexane, isooctane, lower alkanols, and lower alkanol esters of lower alkanoic acids, and obtaining as the resulting product at least one oxygen-containing heterocyclic compound selected from the class consisting of gamma - (omega - carboxypropyl)butyrolactone and gamma-(omega-carbalkoxypropyl)butyrolactone.

5. Process for preparing a gamma-(omega-carbalkoxypropyl)butyrolactone which comprises heating and hydrogenating $[\Delta^{2,2'(5H,5'H)}$-bifuran]-5,5'-dione with hydrogen in contact with a nickel hydrogenation catalyst at a temperature of 75° to 275° C. and under a pressure of 1000 to 10,000 lb./sq. in. in the presence of a lower alkanol as reaction medium and obtaining as the resulting product a gamma-(omega-carbalkoxypropyl)butyrolactone.

6. Process for preparing a gamma-(omega-carbalkoxypropyl)butyrolactone which comprises heating and hydrogenating $[\Delta^{2,2'(5H,5'H)}$-bifuran]-5,5'-dione with hydrogen in contact with a nickel hydrogenation catalyst at a temperature of 75° to 275° C. and under a pressure of 1000 to 10,000 lb./sq. in. in the presence of a lower alkanol ester of a lower alkanoic acid as reaction medium and obtaining as the resulting product a gamma-(omega-carbalkoxypropyl)butyrolactone.

7. Process for preparing gamma-(omega-carbethoxypropyl)butyrolactone which comprises heating and hydrogenating $[\Delta^{2,2'(5H,5'H)}$-bifuran]-5,5'-dione with hydrogen in contact with a nickel hydrogenation catalyst at a temperature of 75° to 275° C. and under a pressure of 1000 to 10,000 lb./sq. in. in the presence of ethanol as reaction medium and obtaining as the resulting product gamma-(omega-carbethoxypropyl)butyrolactone.

8. Process for preparing gama-(omega-carbethoxypropyl)butyrolactone which comprises heating and hydrogenating $[\Delta^{2,2'(5H,5'H)}$-bifuran]-5,5'-dione with hydrogen in contact with a nickel hydrogenation catalyst at a temperature of 75° to 275° C. and under a pressure of 1000 to 10,000 lb./sq. in. in the presence of ethyl acetate as reaction medium and obtaining as the resulting product gamma(omega-carbethoxypropyl)butyrolactone.

9. Process for preparing gamma-(omega-carboxypropyl)butyrolactone which comprises heating and hydrogenating $[\Delta^{2,2'(5H,5'H)}$-bifuran]-5,5'-dione with hydrogen in contact with a nickel hydrogenation catalyst at a temperature of 75° to 275° C. and under a pressure of 1000 to 10,000 lb./sq. in., in the presence of dioxane as reaction medium and obtaining as the resulting product gamma-(omega-carboxypropyl)butyrolactone.

10. A chemical compound selected from the class consisting of the gamma-monolactone of 4-hydroxysuberic acid, salts and esters of said gamma-monolactone, and salts and amides of 4-hydroxysuberic acid.

11. A gamma(omega-carbalkoxypropyl)butyrolactone wherein the alkoxy group is a lower alkoxy group of not more than five carbon atoms.

References Cited in the file of this patent

Adkins et al.: J. Am. Chem. Soc., 53, pages 1095–7, 1931.

Adkins: "Reactions of Hydrogen," Table 54 (page 105); also pages 135 and 138 (1937).

Russell et al.; J. A. C. S., 74, 4543–6 (1952).